United States Patent [19]

Sakata

[11] Patent Number: 5,187,331
[45] Date of Patent: Feb. 16, 1993

[54] SH WAVE GENERATOR
[75] Inventor: Shoji Sakata, Tsukuba, Japan
[73] Assignee: Science and Technology Agency, Ibaraki, Japan
[21] Appl. No.: 676,418
[22] Filed: Mar. 28, 1991
[51] Int. Cl.[5] .............................................. G01V 1/04
[52] U.S. Cl. ................................. 181/121; 181/114; 367/189; 367/75
[58] Field of Search .................. 367/75, 189; 181/114, 181/121, 113

[56] References Cited
U.S. PATENT DOCUMENTS

| | | | |
|---|---|---|---|
| 3,280,935 | 10/1966 | Brown | 367/189 |
| 4,321,981 | 3/1982 | Waters | 367/189 |
| 4,735,280 | 4/1988 | Cole | 181/113 |
| 4,842,094 | 6/1989 | Willis | 181/114 |
| 4,848,512 | 7/1989 | Airhart | 181/114 |
| 4,871,045 | 10/1989 | Cole | 181/114 |

Primary Examiner—J. Woodrow Eldred
Attorney, Agent, or Firm—Nikaido, Marmelstein, Murray & Oram

[57] ABSTRACT

The SH wave generating apparatus includes a driving plate (1) of increased rigidity; a fixing device (6) provided on the bottom of the driving plate for fixing the driving plate onto the earth's surface; a plurality of hydraulic actuators (2) mounted on the driving plate, which have reaction masses and act tangentially on the same circumference from the center of the driving plate; and a driving device (4,5) for reciprocating the plurality of hydraulic actuators (2) at a controlled frequency, thereby generating transverse waves. The plurality of hydraulic actuators (2) are equidistantly mounted on the driving plate (1), and each include a cylinder (2) and a piston rod extending therethrough. The said piston rod is mounted at both ends on supports (3) fixed to the driving plate (1) and the cylinder acts as a reaction mass. Alternatively, the piston rod extending through the cylinder 2 may be provided at both ends with reaction masses. The plurality of hydraulic actuators (2) are reciprocated synchronously or at controlled phases to generate SH or S waves. Also, the driving plate (1) is provided at its center with a vertical member (11) for applying vertical load through a bearing (7) and a pneumatic spring (8). Connected to a central portion of a motor vehicle, the vertical member (11) is designed to apply vertical load to the present apparatus through hydraulic mechanisms and hold up the present apparatus while on wheels.

11 Claims, 3 Drawing Sheets

FIG. 2(a)
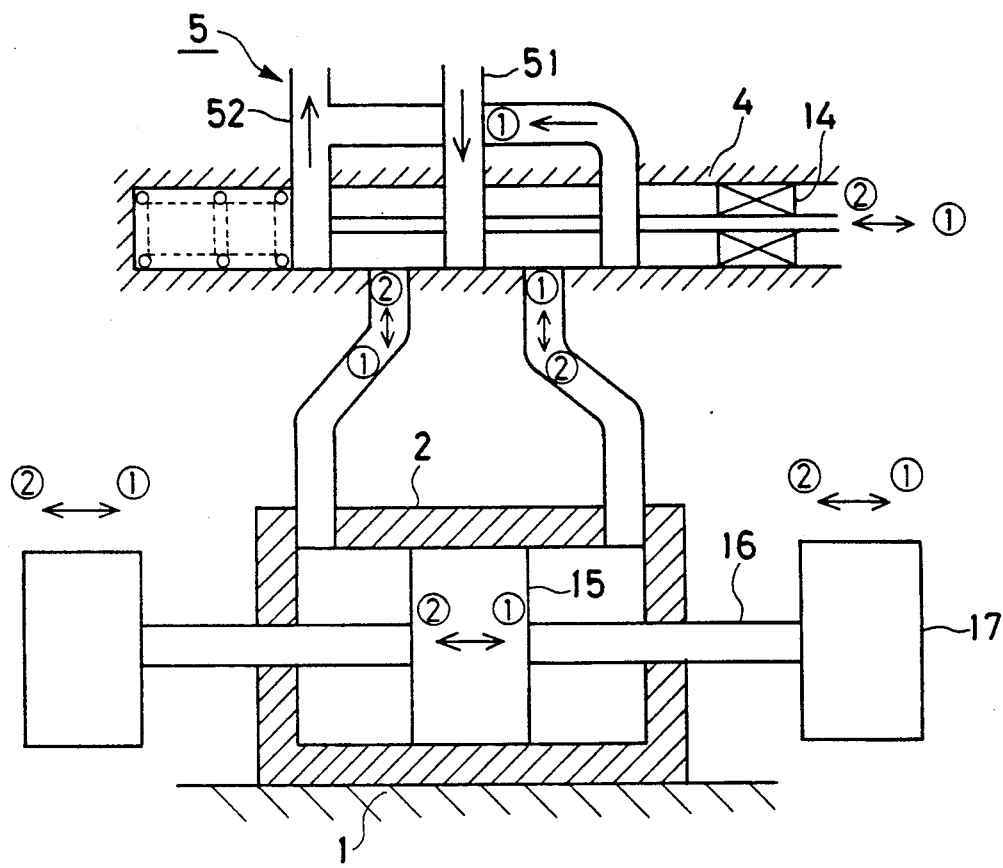
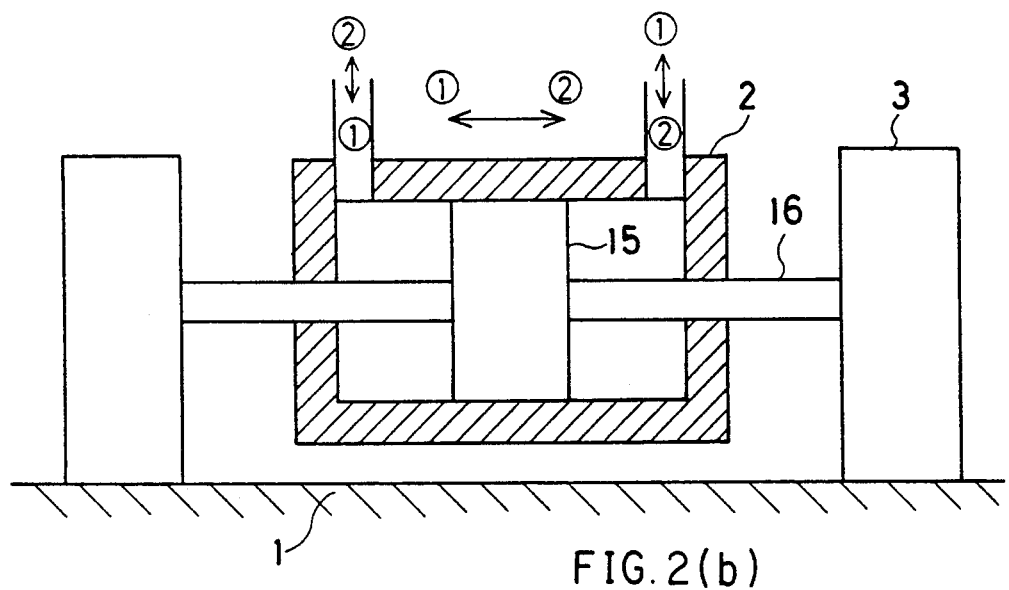
FIG. 2(b)

SH WAVE GENERATOR

BACKGROUND OF THE INVENTION

The present invention relates to an SH wave generator designed to generate pure SH or transverse (shear) waves alone.

Investigations of underground structures by artificial seismic waves are crucial for both scientific purposes such as geophysical exploration and practical purposes such as ground surveying.

So far, P waves (longitudinal or compressional waves) have often been used as the seismic waves to this end. However, S waves also play an important role in making such investigations, because the elastic properties of matter vary with P and S waves. For instance, the P waves transmit through fluid zones, but the S waves do not, and bounce off the fluid-solid interfaces. For that reason, experts now believe that the S waves provide promising means for making a survey of what condition underground magmas are in or other investigations. It is also known that the concept of ground strength, important in terms of earthquake-proofness, is more affected by S wave velocity than by P wave velocity.

The S waves are broken down into SH waves causing wall particles to move in parallel to the surface of the earth and SV waves allowing soil particles to move vertically with respect to the surface of the earth. Upon reaching the underground fluid-solid interfaces, the SV waves are divided into reflected SV and P waves and refracted SV and P waves. By contrast, the SH waves only give rise to reflected SH waves and refracted SH waves when striking on the interfaces. In view of elastic waves, the SH waves are thus considered to be easier to manipulate than the SV waves, because their reflection and refraction mechanisms on the fluid-solid interfaces are relatively simple.

In order to make surveys as mentioned above by the S waves, an apparatus for generating the SH waves alone would be convenient to relay upon. So far, "SH wave cannon" and "plate vibration" techniques have been utilized for that purpose. There two types of apparatus are both designed to apply impactive shear forces to the earth's surface to generate SH waves.

However, a problem with the "SH wave cannon" technique is that although producing increased outputs, it is troublesome to handle. A difficulty with the "plate vibration" technique, on the other hand, is that it is easy to handle, but the energy to be produced is too low to achieve wide coverage.

For earthquake prediction, there is available the so-called vibrosize reflection technique, according to which a strong vibrator with a built-in hydraulic actuator is mounted on a motor vehicle for mobile seismic exploration. In this case, the frequency of the vibrator may be controlled on any desired time scale by a combination of electronics with hydraulic mechanism. For example, this may make is possible to generate the so-called sweep waves whose frequency varies with time. These input waves and the resulting reflected waves are well suited for data processing. With this technique, generally making use of P waves, some experiments have recently been attempted to generate S waves by oscillating the hydraulic actuator in parallel to the earth's surface. In this case, however, SV and P waves occur unavoidably in addition to the SH waves.

SUMMARY OF THE INVENTION

It is a primary object of this invention to provide mobile equipment which provides a strong generation of pure SH waves alone while controlling their frequency and is mounted on a mobile carrier such as a motor vehicle.

According to this invention, this object is achieved by the provision of apparatus for generating SH waves characterized by comprising:

a driving plate of increased rigidity;

a fixing device provided on the bottom of the driving plate for fixing the driving plate onto the earth's surface, a plurality of hydraulic actuators mounted on the driving plate, which have reaction masses and act tangentially on the same circumference from the center of the driving plate, and driving device for reciprocating the plurality of hydraulic actuators at a controlled frequency, thereby generating transverse waves.

Further, the present invention is characterized in that the plurality of hydraulic actuators are even in number and are equidistantly mounted on the driving plate, each including a cylinder and a piston rod extending therethrough. The piston rod is mounted at both ends on supports fixed to the driving plate and the cylinder acts as a reaction mass. Alternatively, a cylinder is fixed to the driving plate and a piston rod extends therethrough. The piston rod is provided at both ends with reaction masses. According to this feature, the plurality of hydraulic actuators may be reciprocated synchronously, thereby generating SH waves.

Still further, the present invention is characterized in that the driving plate is provided at its center with a vertical member through a bearing and a pneumatic spring, and the fixing device is defined by a plurality of projections extending downwardly from the bottom of the driving plate. A frictional material is provided on the lower bottom side of the driving plate, or foundations fixed into the earth's surface.

Still further, the present invention is characterized in that the driving device is adapted to drive the plurality of hydraulic actuators synchronously or at controlled phases.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 2(a)-2(b) are views illustrative of how the hydraulic actuator is constructed and operated.

DESCRIPTION OF PREFERRED EMBODIMENTS

The present invention will now be explained in greater detail with reference to a specific embodiment shown in the accompanying drawings.

Figure 1A:
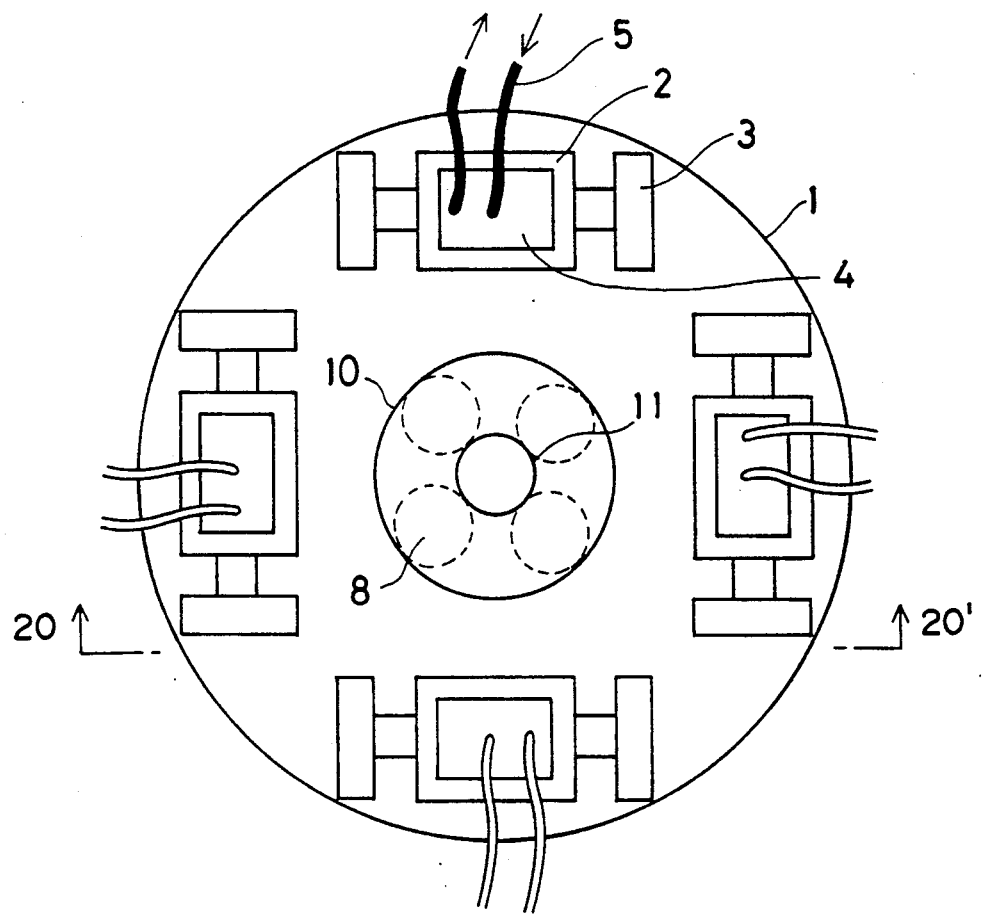
FIGS. 1(a)-1(b) are views showing illustrating one embodiment of the SH wave generator according to this invention.
Figure 1B:
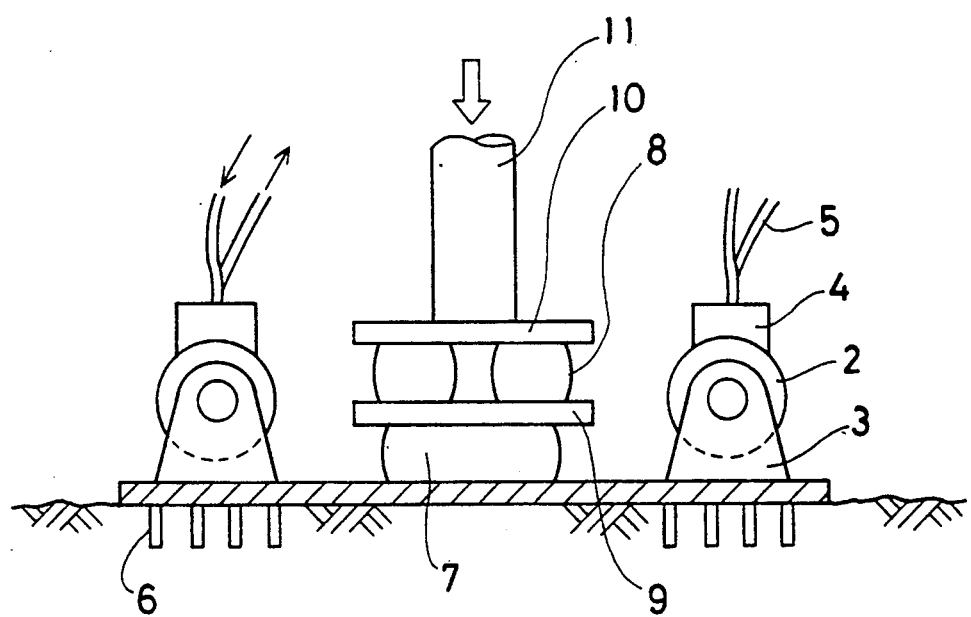

Referring now to FIGS. 1(a)–1(b), a driving plate 1 has a rigidity so increased that when receiving tangential force from actuators, it moves uniformly, as is the case of a steel disc. As illustrated, the driving plate 1 is equidistantly provided with a plurality of hydraulic actuators, each comprising a hydraulic cylinder 2, on the same circumference and includes a plurality of projections extending downwardly from the bottom. The actuators are operated tangentially on the circumference. It is noted that FIG. 1(a)–1(b) are plan and front views, respectively.

As can be best seen from FIG. 1(b), the driving plate 1 is centrally provided with a bearing 7, on which a lower pneumatic spring mount 9, pneumatic springs 8 (three in this embodiment) and an upper pneumatic spring mount 10 are placed in that order. The upper pneumatic spring mount 10 is then connected at its center with a vertical member 11. Connected to a central portion of a motor vehicle, the vertical member 11 is designed to apply vertical load to the present apparatus through a hydraulic mechanism or hold up the present apparatus while on wheels.

As illustrated in FIGS. 1(a)–1(b), each of the hydraulic actuators includes the hydraulic cylinder 2 through which a piston rod extends. The piston rod is mounted at both its end on supports 3. The hydraulic cylinder 2 is then provided with an electrically controllable servo valve 4 for effecting a switching-over of hydraulic pressure supplied from a hydraulic hose 5 thereto. Hence, the hydraulic cylinder is reciprocated as a reaction mass at any desired frequency. In this case, the servo valves 4 are driven so synchronously that the hydraulic cylinders 2 can be reciprocated synchronously, resulting in the application of oscillating moment to the driving plate 1. This moment is then transmitted to the ground through the driving plate 1 and projections 6, generating SH waves.

With the present SH wave generator wherein, as explained above, the reaction mass is synchronously reciprocated by a plurality of hydraulic cylinders mounted rotation-symmetrically around the center of the driving plate, thereby imparting oscillating moment to the driving plate pressed against the earth's surface through the resulting reaction, it is possible to transmit pure SH waves into the ground.

In addition, thrust and radial bearings are mounted on the axial center of the driving plate to receive substantially vertical members from above. Thus, the driving plate can be pressed onto the earth's surface by applying axial load to the vertical members, thereby increasing frictional force with respect to the rotation acting between the two. Due to the presence of these bearings, the driving plate can also move without receiving resistance, irrespective of vertical load being applied thereto. On the contrary, the rotational motion of the driving plate is cut off by the bearing portions, thus producing no influence upon the vertical members or their holder portions.

Moreover, one or more pneumatic springs or air bags are inserted between the bearing portion and the vertical member portion, whereby even when the driving plate is tilted with respect to the vertical members, uniform load can be applied to the driving plate, because that tilt can be absorbed. Due to the presence of such pneumatic springs or air bags, it is also possible to prevent unnecessary vertical vibrations from being transmitted from the vehicle body to the driving plate. It is noted that the bearings may be dispensed with, if the pneumatic springs or air bags are pre-regulated to a suitable lateral spring constant.

While the hydraulic actuator shown in FIGS. 1(a)–1(b) is designed such that, as illustrated in FIG. 2(b), a piston rod 16 is mounted at both its end on the associated supports 3 to reciprocate the hydraulic cylinder 2 as the reaction mass, it is understood that, as illustrated in FIG. 2(a), the hydraulic cylinder 2 may be fixed to the driving plate 1 to reciprocate a piston rod 16 having reaction masses 17 at both its ends. In the arrangement shown in FIG. 2(b), the cylinder 2 may be reciprocated as the reaction mass at any desired frequency, as already mentioned.

As illustrated in FIG. 2(a), the servo valve 4 includes a solenoid coil 14, which is excited in such a controllable manner as to drive the rod in the direction shown at (1) or (2).

As the neutral position, supply and drain lines 51 and 52 of the hydraulic hose 5 are both closed up, as illustrated. However, as the rod is driven by the excitation of the solenoid coil 14 in the direction shown at (1), by way of example, the supply line 51 is connected to a left-hand port in the hydraulic cylinder 2, while a right-hand portion in the hydraulic cylinder is connected to the drain line 52. Consequently, the piston 15 is driven in the right-hand direction. Likewise, as the rod is driven by the excitation of the solenoid coil 14, the line circuit opposite to the above-mentioned one is defined to drive the piston 15 in the opposite or left-hand direction. By controlling the excitation of the solenoid 14 to reciprocate the rod alternately in the directions (1) and (2), it is thus possible to reciprocate the reaction masses 17 at any desired frequency.

It is understood that the hydraulic cylinder may be drive not only by using the servo valve 4 including the solenoid coil 14, as mentioned above, but also by a system using pressure valves controllable by pilot valves or other general hydraulic circuits so far used.

Figure 3A:
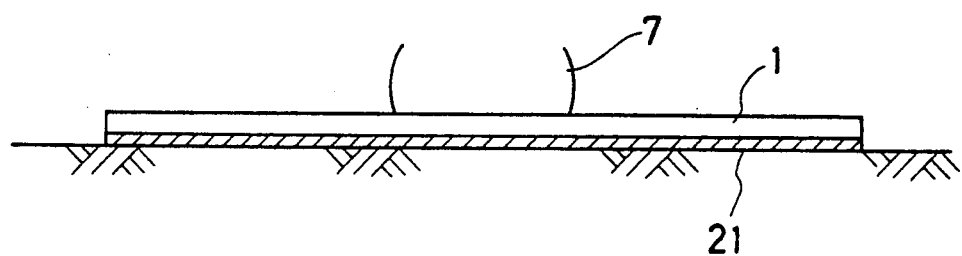
FIGS. 3(a)-(b) are views illustrative of how the driving plate is fixed onto the earth's surface.

In the above-mentioned embodiment, the driving plate 1 is designed to be fixed on the earth's surface by the projections 6 extending from its bottom. However, when the present apparatus is used on a substantially uniform, flat plot of land having a high coefficient of friction, e.g. on a paved road, a hard rubber pad or other frictional material 21 may be provided on the lower bottom side of the driving plate 1 in place of the projections 6, as illustrated in FIG. 3(a). In this case, the hard rubber pad may additionally be made irregular on its surface in contact with the road surface, thereby increasing its coefficient of friction.

The driving plate may be designed to be fixed at its circumferential edge with the rest being above the ground. In order to assure that the driving plate is fixed onto an unleveled, irregular plot of land, it may be provided with a rotation-symmetrical array of extending arms, which enable the projections or hard rubber pad to take firm hold of the ground. To what degree of fixation depends upon the number of the arms.

Figure 3B:
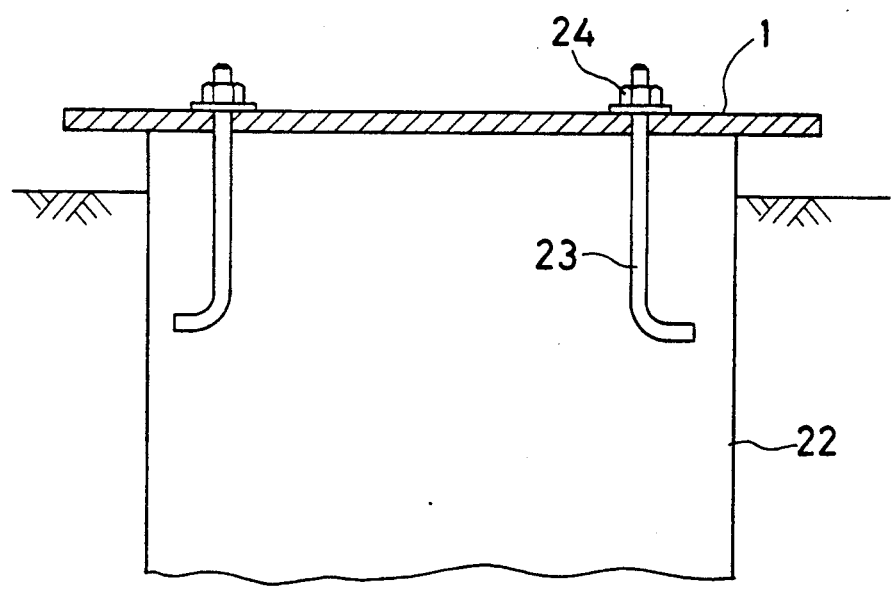

Alternatively, the present apparatus may be fixed in place by making use of foundations 22 firmly pre-attached to the earth's surface, as illustrated in FIG. 3(b), in which case it is unnecessary to apply vertical load to the driving plate 1, because the driving plate 1 is fixed onto the foundations 22 by means of stud bolts 23 and nuts 24.

It is appreciated that while this invention has been described specifically with reference to the above-mentioned embodiment, various modifications may be made within the scope of this invention. For instance, the number of the hydraulic actuators to be mounted on the driving plate 1 may be three or five or more, although four are illustrated. Also, while all the hydraulic actuators have been described to be synchronously driven, a diametrical pair(s) of hydraulic actuators may be driven with another diametrical pair(s) of hydraulic actuators in the same or opposite direction or at relatively different phases to impart directionality thereto.

What we claim is:

1. An apparatus for generating SH waves comprising:
   a rigid driving plate;
   fixing means provided on a bottom of said driving plate for fixing said driving plate onto a surface of the earth;
   a plurality of hydraulic actuators equidistantly mounted on a circumference of said driving plate, which have reaction masses and act tangentially on a same circumference from a center of said driving plate; and
   driving means for reciprocating said plurality of hydraulic actuators independent of each other parallel to said surface of the earth at a controlled frequency, therein generating transverse waves.

2. An apparatus for generating SH waves as claimed in claim 1, wherein an even number of said plurality of hydraulic actuators are provided and are equidistantly mounted on said driving plate.

3. An apparatus for generating SH waves as claimed in claim 1, wherein said plurality of hydraulic actuators each include a cylinder and a piston rod extending therethrough, said piston rod being mounted at both ends on supports fixed to said driving plate and said cylinder acting as a reaction mass.

4. An apparatus for generating SH waves as claimed in claim 1, wherein said plurality of hydraulic actuators each include a cylinder fixed to said driving plate and a piston rod extending therethrough, said piston rod being provided at both ends with reaction masses.

5. An apparatus for generating SH waves as claimed in claim 1, wherein said driving plate is provided at a center with a vertical member for applying vertical load through a bearing and a pneumatic spring.

6. An apparatus for generating SH waves as claimed in claim 5, wherein said fixing means comprises a plurality of projections extending downwardly from the bottom of said driving plate.

7. An apparatus for generating SH waves as claimed in claim 5, wherein said fixing means comprises a frictional material provided on the bottom of said driving plate.

8. An apparatus for generating SH waves as claimed in claim 1, wherein said fixing means comprising a foundation fixed into the surface of the earth.

9. An apparatus for generating SH waves as claimed in claim 1, wherein said driving means drives said plurality of hydraulic actuators synchronously.

10. An apparatus for generating SH waves as claimed in claim 1, wherein said driving means drives said plurality of hydraulic actuators at controlled phases.

11. An apparatus for generating SH waves according to claim 1 wherein at least two of said hydraulic actuators are mounted perpendicular to each other.

* * * * *

UNITED STATES PATENT AND TRADEMARK OFFICE
CERTIFICATE OF CORRECTION

PATENT NO. : 5,187,331
DATED : February 16, 1993
INVENTOR(S) : Shoji SAKATA

It is certified that error appears in the above-indentified patent and that said Letters Patent is hereby corrected as shown below:

On the title page, Item [73], add -- National Research Institute for Earth Science and Disaster Prevention -- after the present name "Science and Technology Agency".

Signed and Sealed this

Twenty-third Day of August, 1994

Attest:

BRUCE LEHMAN

Attesting Officer

Commissioner of Patents and Trademarks